(No Model.) 3 Sheets—Sheet 1.

W. L. KANN.
APPARATUS FOR WORKING STONE.

No. 461,221. Patented Oct. 13, 1891.

WITNESSES.
INVENTOR.
William L. Kann
by W. Bakewell & Sons
his Attorneys (No Model.) 3 Sheets—Sheet 2.

W. L. KANN.
APPARATUS FOR WORKING STONE.

No. 461,221. Patented Oct. 13, 1891.

WITNESSES.
INVENTOR.
William L. Kann
by W. Bakewell & Sons
his Attorneys.

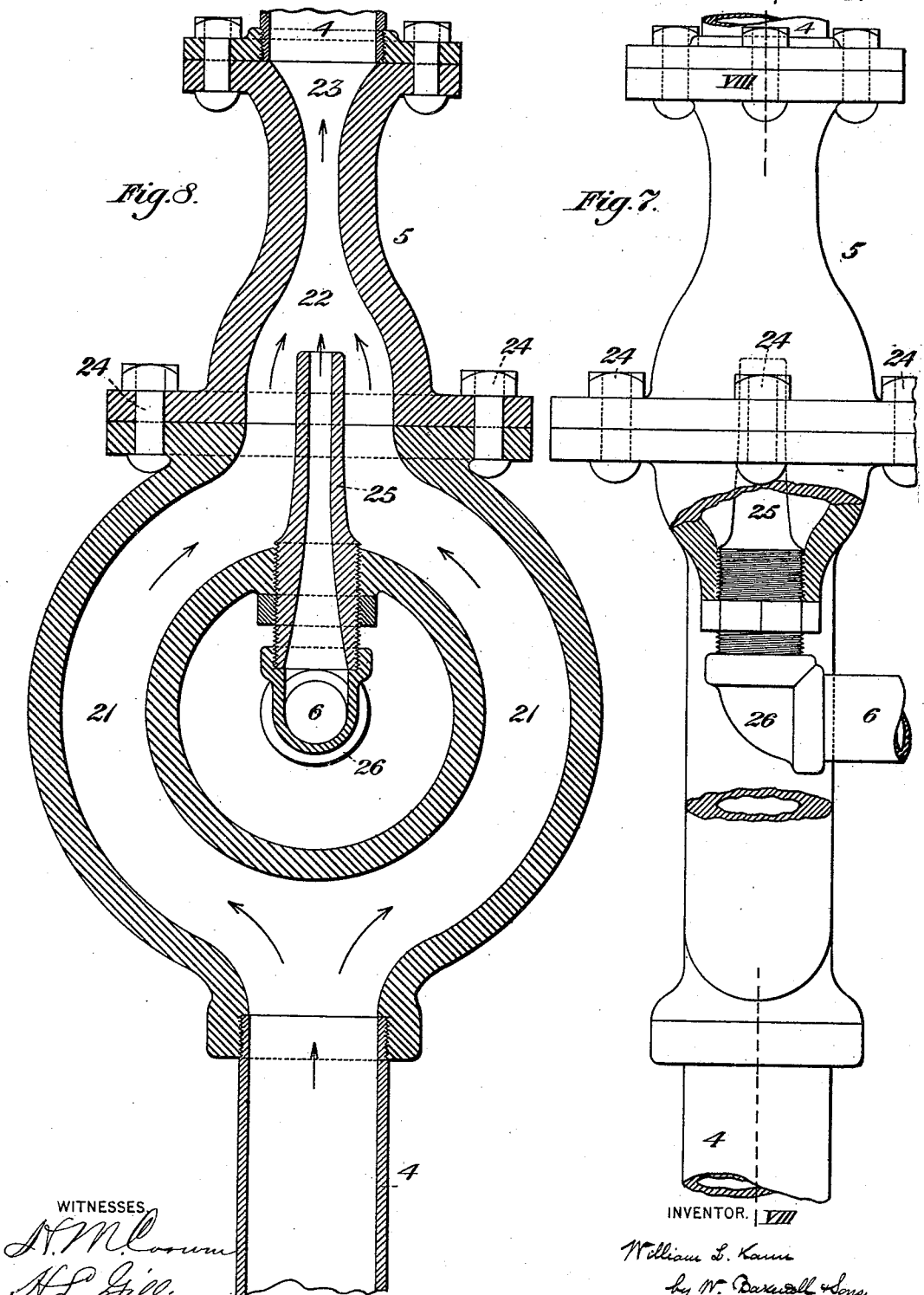

UNITED STATES PATENT OFFICE.

WILLIAM L. KANN, OF ALLEGHENY, ASSIGNOR TO THE PITTSBURGH CRUSHED STEEL COMPANY, LIMITED, OF PITTSBURG, PENNSYLVANIA.

APPARATUS FOR WORKING STONE.

SPECIFICATION forming part of Letters Patent No. 461,221, dated October 13, 1891.

Application filed April 13, 1891. Serial No. 388,665. (No model.)

*To all whom it may concern:*

Be it known that I, WILLIAM L. KANN, of Allegheny, in the county of Allegheny and State of Pennsylvania, have invented a new and useful Improvement in Apparatus for Working Stone, of which the following is a full, clear, and exact description.

My invention is designed to improve the operation of machines for sawing, rubbing, or grinding stone or other material, by affording convenient means for supplying the abrasive material, such as particles of chilled metal, broken particles of steel, emery, &c.

The invention consists, first, in a stone-working apparatus having a tank and distributer connected by a vertical injector-pipe, whereby clogging of the pipes is totally obviated; second, in a closed distributer whereby a pressure may be maintained therein to prevent any settling of the abrading material to the bottom of the distributer, and, third, in a branch steam-pipe, which leads to the tank and keeps the material stirred up and well mixed therein.

It also consists in certain other features of construction and arrangement hereinafter mentioned and claimed.

I shall now proceed to describe my improvement, with reference to the accompanying drawings, in which—

Figure 1:
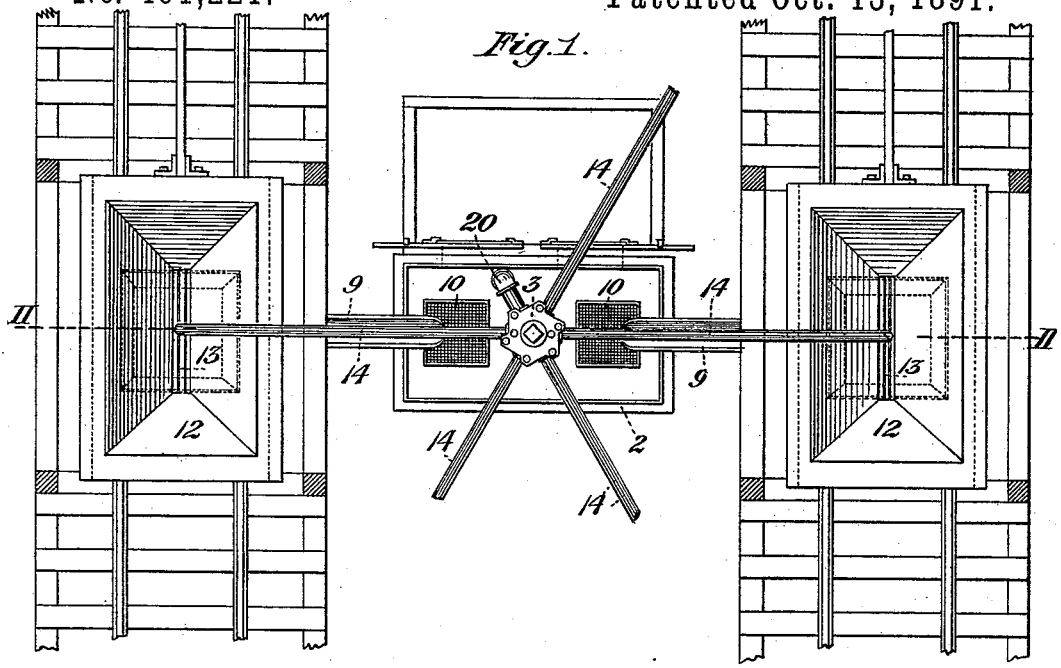
Figure 2:
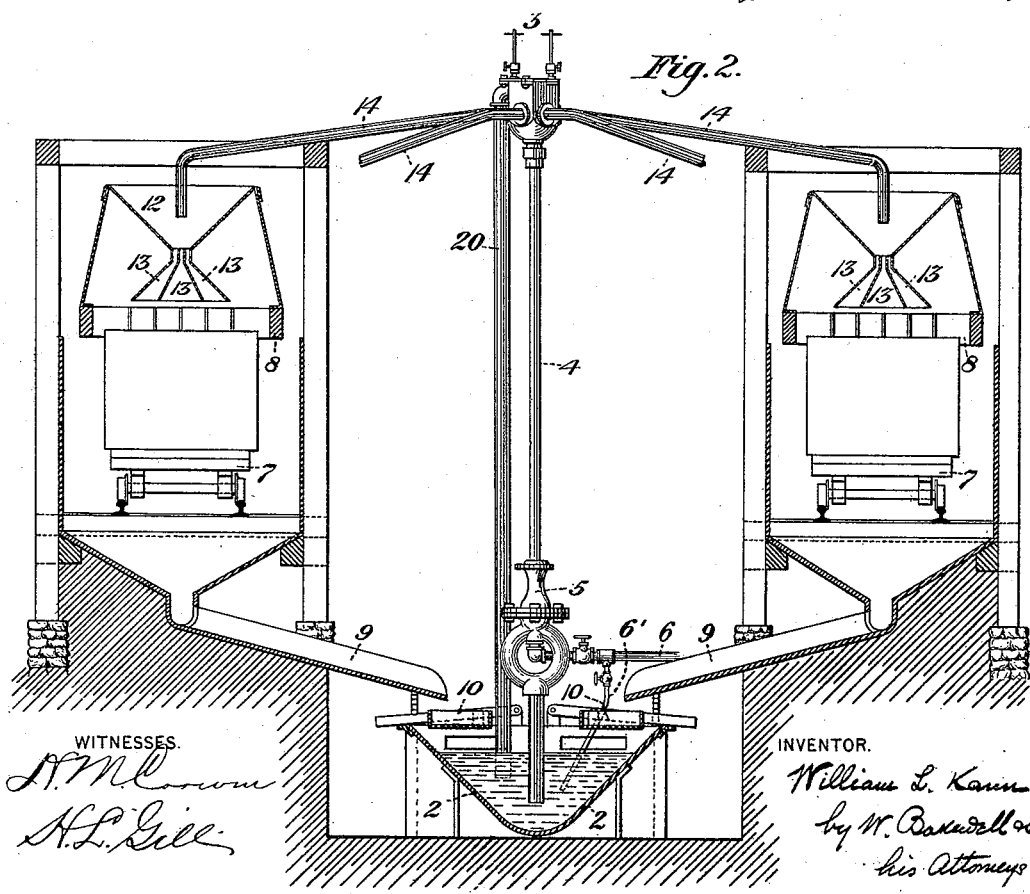
Figure 3:
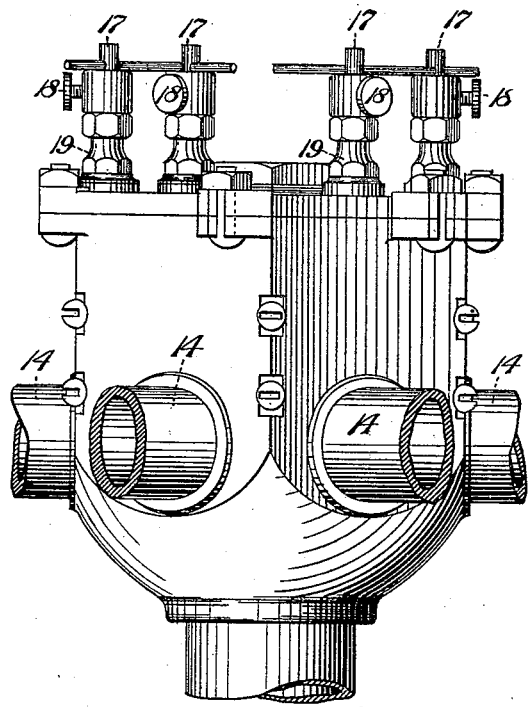
Figure 5:
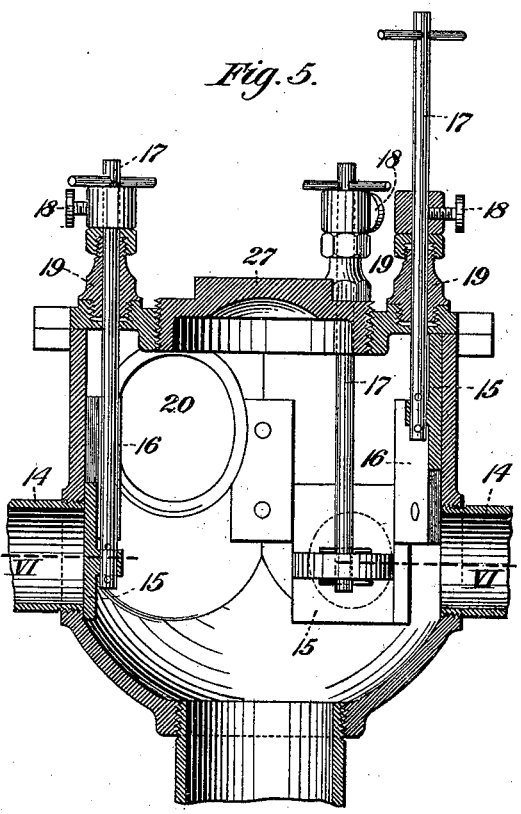
Figure 4:
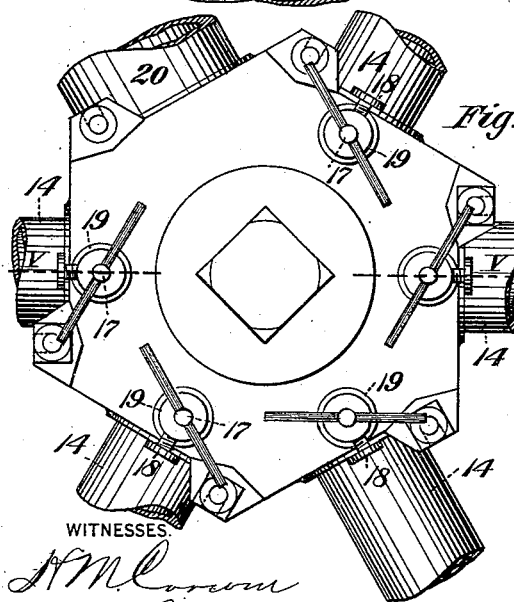
Figure 6:
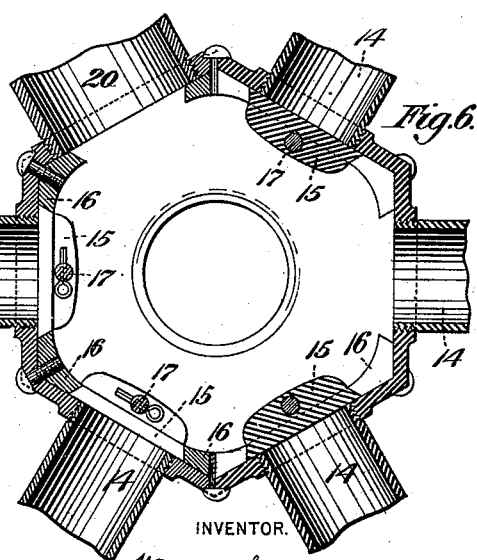

Figure 1 is a plan view of apparatus embodying my invention. Fig. 2 is a vertical sectional view thereof on the line II II of Fig. 1. The figures on the second sheet of the drawings illustrate the distributer, from which a grinding material is fed to the saws. Fig. 3 is a side elevation of the distributer, the pipes being shown in section. Fig. 4 is a plan view thereof. Fig. 5 is a vertical section on the line V V of Fig. 4, and Fig. 6 is a horizontal section on the line VI VI of Fig. 3. The figures on the third sheet of the drawings illustrate the construction of the siphon-pump, by which the grinding material is fed to the distributer. Fig. 7 is an edge elevation thereof, partly in section; and Fig. 8 is a vertical section on the line VIII VIII of Fig. 7.

Like symbols of reference indicate like parts in each.

Referring to Figs. 1 and 2, 2 represents a tank of conical shape adapted to contain water and a grinding material, which may consist of small particles of fractured steel or other material. 3 is an elevated distributer into which the steel particles are delivered from the tank 2. This distributer is closed, as shown, in order that a pressure may be maintained therein and that the strong current induced by the entering grinding material and water may prevent any settling of the material inside the distributer. 4 is a pipe connecting the distributer 3 with the tank 2, and 5 is a steam siphon-pump, preferably of peculiar construction, which is set in a line with the pipe 4 and is provided with a steam-supply pipe 6. It is essential that the pipe 4 should be vertical, as shown, in order that all the material therein may drop back into the tank 2 when the injector is shut off, and thus prevent clogging of such pipe.

7 7 are cars carrying the stone to be sawed. The cars are set in gangs 8, having inclined bottoms, from which troughs 9 lead to and discharge into sieves 10 above the tank 2. Above the stone on the car in each gang 8 is a funnel 12, having delivery-openings 13 and adapted to deliver the grinding material with water to the several saws. Pipes 14 lead from the distributer 3 and discharge into said funnels. These pipes open laterally into the distributer, and their openings are controlled by slide-valves 15, which move vertically in guides 16 and are operated by lifting rods or stems 17, which pass through caps 19 and which may be provided with lock-screws 18. The guides of the valves are beveled, as shown, and the internal pressure on the reservoir tends to force them to their seats. Each may be opened or closed separately, so as to deliver the grinding material into any one or more of the pipes 14, and as they operate with a vertical lifting action and as their edges are covered by the beveled guides 16 they cannot be clogged by the grinding material, and as they are not apt to be worn by abrasive action they are very durable. The construction is such, also, that packing for the valves is unnecessary.

20 is an overflow-pipe, which leads from the distributer at a point above the level of the pipes 14 and extends down so as to discharge into the tank 2.

27 is a cap fitted to the top of the distributer and removable, so as to expose a man-hole, through which access can be had to the interior. If desired, the overflow-pipe may be fitted to this man-hole in place of the cap. By closing the distributer a pressure can be maintained therein, by reason of which the abrading material is constantly stirred up by the entering steam and water and the liquid flows to the saws under pressure as well as by gravity.

The operation is as follows: The tank 2 is charged with grinding material and water. Steam is admitted through the pipe 6 into the siphon-pump and elevates the water and grinding material to the distributer 3, whence it flows through the pipes 14 to the stone blocks which are being sawed. The surplus water and grinding material descend again to the tank 2 through the overflow-pipe 20, thus maintaining in the tank a constant agitation, which prevents the grinding material from settling at the bottom and also keeps in suspension the mud in the water, so that it can be removed with the water through an overflow-drain. The water and grinding material after performing their work at the saws return in the troughs 9 to the sieves 10, which retain all large particles of stone and permit the water and grinding material to pass into the tank 2.

The pump 5 is of peculiar construction, which forms part of my invention. Steam siphon-pumps as heretofore constructed have not been used for delivering abrasive grinding material and have not been adapted to such use, principally, because when the steam is shut off the material falling back to the pump lodges in a projection or recess above the steam-nozzle and so clogs the pump and stops its operation. The pump is illustrated in Figs. 7 and 8. The body of the pump may be of the annular form shown, having chambers 21, which come together at the top and bottom and which terminate in an upwardly-tapering passage or neck 22, which at its upper end flares outwardly in regular lines, as at 23. Between the ends of the parts 22 and 23 the neck is of contracted diameter, so as to intensify the action of the steam. Said neck is preferably made of a separate casting secured to the body of the pump by bolts 24 or otherwise, so that it can be replaced when desired. 25 is the steam-supply nozzle, which extends axially into the part 22 and is screwed to the body of the pump, as shown. The steam-supply pipe 6 is connected with the nozzle 25 by a suitable coupling 26. When the steam discharges into the pump through the nozzle, it creates suction, which elevates the water and grinding material and discharges them forcibly through the pipe 4 into the elevated distributer. When the steam-supply is shut off, the particles of grinding material fall back; but as there is no projecting recess in the neck of the pump they cannot lodge there and cannot choke the pump. Any particles which may enter the nozzle 25 are ejected therefrom when the steam is turned on.

Instead of using the overflow-pipe 20 as the means for causing an agitation of the liquid in the tank, I may use, in addition thereto or alone, the steam-pipe 6', which extends into the tank from the pipe 6 and is provided with a valve. When grinding material stands quiet in the tank for some time, it is apt to cake in the bottom thereof; but by passing steam through the pipe 6' such cake is agitated and broken up, so as to liberate the particles of grinding material and to diffuse them through the liquid in the tank.

In order to prevent the nozzle and body of the pump from being cut by the abrasive action of the grinding material, I prefer to make them of chilled iron or very hard steel.

The advantages of my invention will be appreciated by those skilled in the art.

I claim—

1. In stone-working apparatus, the combination, with a distributer, of an injector leading thereto, said injector comprising a vertical supply-pipe, an eduction-pipe substantially in line with the supply-pipe and provided with an intensifying neck tapering in regular lines and without recess for the lodgment of the grinding material, and a steam-supply nozzle extending into said eduction-pipe, substantially as and for the purposes described.

2. In apparatus for working stone, the combination of a tank containing abrasive material, a distributer above the tank, and an ejector having a vertical pipe connecting them and having an intensifying neck without recess for the lodgment of the grinding material, said pump receiving the material from the tank and delivering it to the machine, substantially as and for the purposes described.

3. In apparatus for working stone with abrasive grinding material, the combination of the tank containing grinding material, a lifting pump, an elevated closed distributer, pipes leading therefrom, and vertical slide-gates controlling the openings of said pipes, substantially as and for the purposes described.

4. In apparatus for working stone with abrasive grinding material, the combination of the tank containing grinding material, a lifting-pump, an elevated closed distributer, pipes leading therefrom, and slide-gates located therein and controlling the openings of said pipes, said slide-gates having a flat bearing-face, beveled edges, and beveled guides covering the edges, substantially as and for the purposes described.

5. In apparatus for working stone with abrasive grinding material, the combination, with the stone-working machines and a tank containing the grinding material, of an elevated distributer having pipes leading to the machines, an ejector discharging from the tank into the distributer, and a branch steam-pipe leading into said tank, substantially as and for the purposes described.

6. In apparatus for working stone with abrasive material, the combination, with the stone-working machines and a tank containing the grinding material, of an elevated closed distributer having pipes leading to the machines, and an ejector discharging from the tank into the distributer, substantially as and for the purposes described.

In testimony whereof I have hereunto set my hand this 10th day of April, A. D. 1891.

WILLIAM L. KANN.

Witnesses:
W. B. CORWIN,
H. M. CORWIN.